Aug. 16, 1932.  R. P. MAY  1,871,715
FILM TAKE-UP
Filed Dec. 15, 1930  2 Sheets-Sheet 1

INVENTOR
RUSSELL P. MAY
BY
ATTORNEY

Aug. 16, 1932.  R. P. MAY  1,871,715
FILM TAKE-UP
Filed Dec. 15, 1930  2 Sheets-Sheet 2
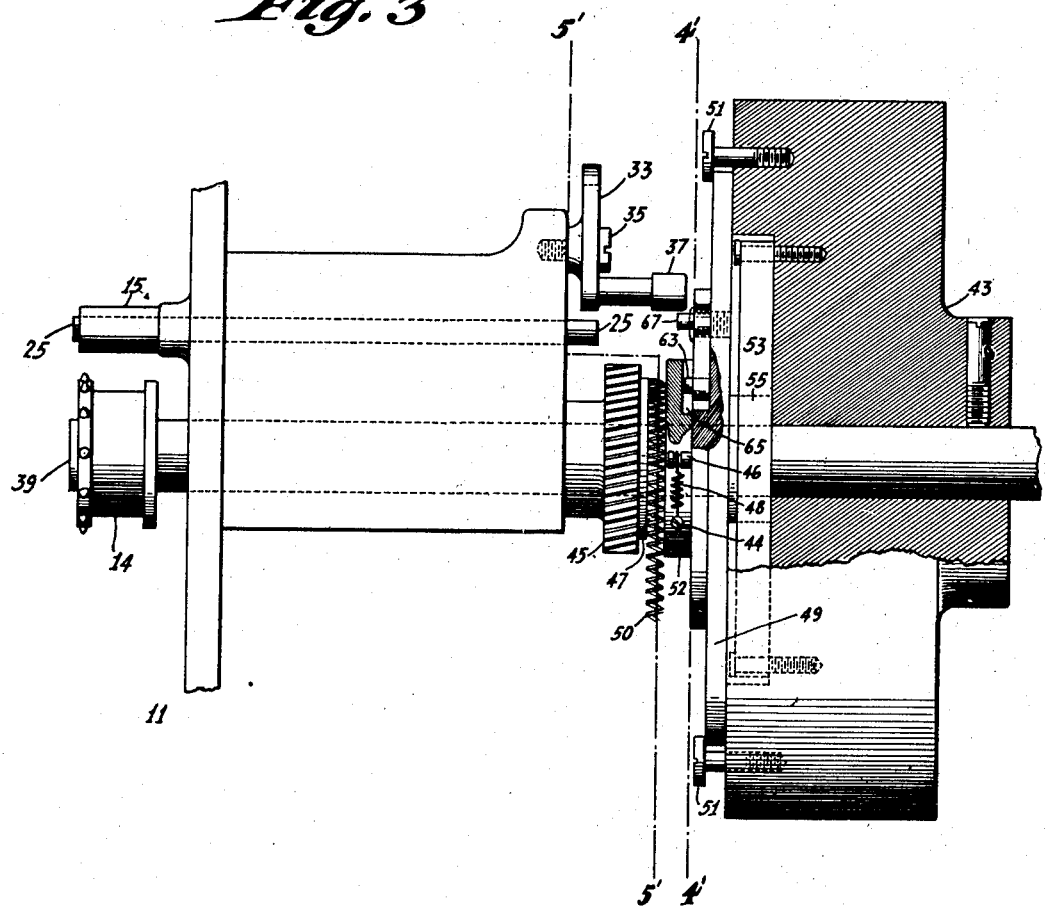
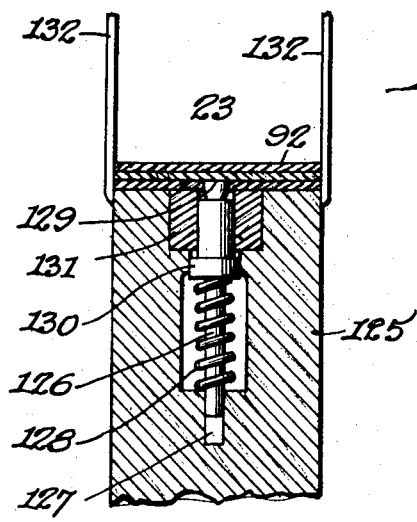
INVENTOR
RUSSELL P. MAY
BY
ATTORNEY Patented Aug. 16, 1932

1,871,715

UNITED STATES PATENT OFFICE

RUSSELL P. MAY, OF HADDONFIELD, NEW JERSEY, ASSIGNOR TO RADIO CORPORATION OF AMERICA, A CORPORATION OF DELAWARE

FILM TAKE-UP

Application filed December 15, 1930. Serial No. 502,310.

The present invention relates to motion picture projectors, or more particularly to projectors of the type in which the film is automatically fed through the projector and attached to the pick-up reel.

In automatically feeding the film through a motion picture projector, and more particularly in attaching the end of the film to the take-up reel, it is necessary that a guide means be associated with the hub of the take-up reel which guide means, after connection of the film to the hub, must be withdrawn to permit the film to build up on the hub, and also to permit the removal of the film reel when the entire film has been exhibited. This invention therefore relates more particularly to means for releasing the take-up guide means upon attachment of the film to the take-up reel.

The broad object of this invention is to provide a new and improved motion picture apparatus.

A more specific object of this invention is to provide a new and improved take-up mechanism for motion picture projectors of the self-threading type.

A still more specific object of this invention is to provide film guiding and guide releasing mechanism for the film take-up of automatic motion picture projectors.

Another object of this invention is to provide a new and useful mechanical motion for actuation of mechanisms of the type described.

Still another object of this invention is to provide means for releasing the film guiding means of a pick-up mechanism as the film becomes attached to the take-up reel.

A still further object of this invention is to provide a releasing mechanism for automatic motion projectors actuated by the pull of the film as it becomes attached to the pick-up reel, to release the film guiding means from the threading position.

These and further objects will become apparent from the following specification taken in connection with the appended claims.

In accomplishing my invention, the film is threaded through a projector of the type shown and described in my co-pending application, Serial No. 392,051 filed September 21, 1929. The film after passing through the various guide and loop forming mechanisms, as shown in the above mentioned co-pending application, is guided toward the periphery of the hub of the take-up reel.

The take-up reel is actuated so that its drum periphery moves faster than the film advances, and as the end of the film passes over the surface of the hub, this over-riding of the drum surface will cause one of a plurality of small pins located upon the hub surface to engage a hole in the end of the film, and thus connect the film to the rotating reel. This is all done in the same manner as in my above mentioned co-pending application.

In accordance with the present invention, the retarding of the take-up reel, due to its connection with a slower moving film, will cause a retarding of the take-up drive apparatus, which latter causes a differential motion between the said apparatus and its driving mechanism, causing a small pin to be projected into the path of a trigger and release mechanism, which latter causes the guide mechanism to be actuated to the running position.

Having thus briefly described my invention, attention is invited to the accompanying drawings in which;

Fig. 3 is a similar view at a different angle showing part of the operating mechanism partially in cross-section;

Fig. 6 is a cross-section of the hub of the reel showing the means for attaching the film to the hub.

Figure 2:
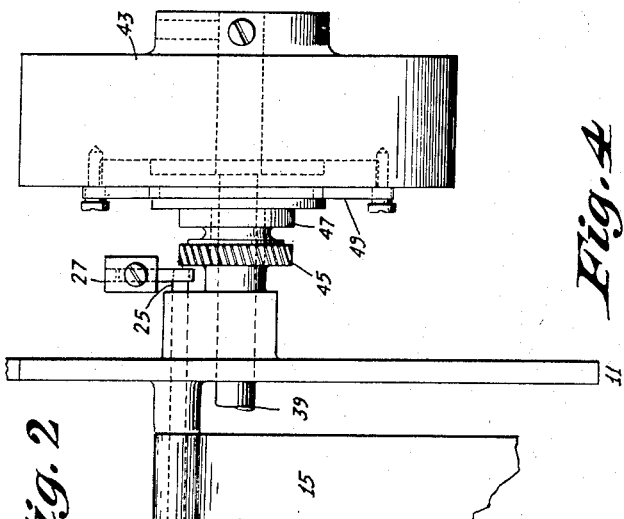
Fig. 2 is a transverse view showing the pick-up driving mechanism as well as the guide mechanism.

In order that they may not be complicated, each of the above described figures of the drawings shows only those parts that are necessary for a clear understanding of this invention.

Attention is now invited more particularly to the drawings in which like parts are designated by similar reference numerals.

Figure 1:
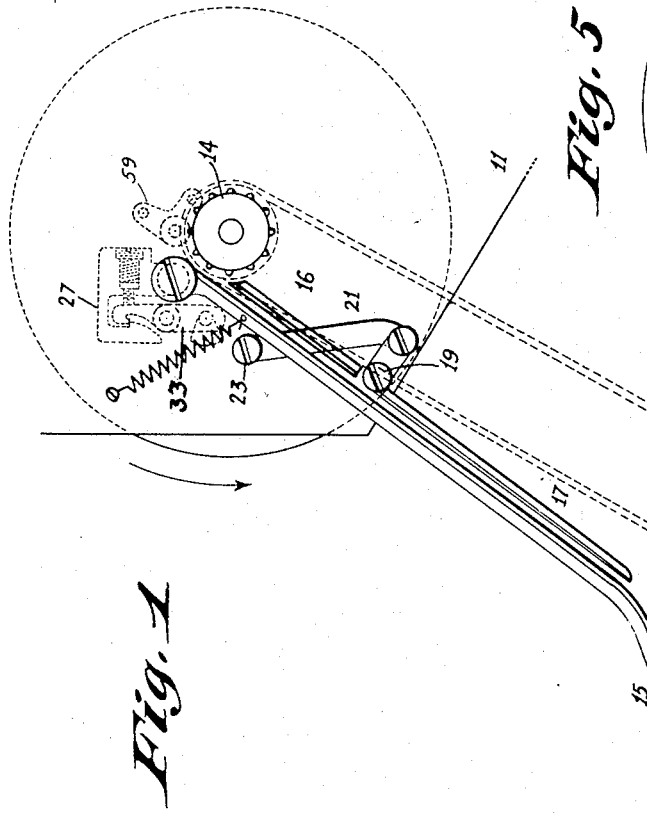
Fig. 1 is a general view showing the guide mechanisms in relation to the release mechanism.

Mounted relative to the frame 11 of the automatic projector is a film take-up reel, the hub 13 of which is shown in Fig. 1. This reel is rotated by a connection with the lower sprocket shaft, as will be described later. For guiding the film from the lower sprocket 14, there is provided a guide member 15 pivoted, as shown in Fig. 2, by means of the shaft 25 to the frame 11. A stationary guide member 16 is provided to conduct the film toward the lower guide member 17, which latter is adapted to cooperate with the guide member 15 to conduct the end of the film toward the hub 13. This latter guide member 17 is pivoted at 19 and is adapted to be operated by means of the link 21 so that upon the rotation of the guide member 15 in the clockwise direction, as shown in Fig. 1, about the shaft 25, the lower guide member 17 will be rotated in a counter-clockwise direction about the pivot 19.

The actual details of these guide members, spring actuating mechanism, closing mechanism, and the provision for attaching the film to the hub 13, are all fully disclosed in my co-pending application mentioned above, and will not be shown or described here as they involve no part of the present invention.

Figure 5:
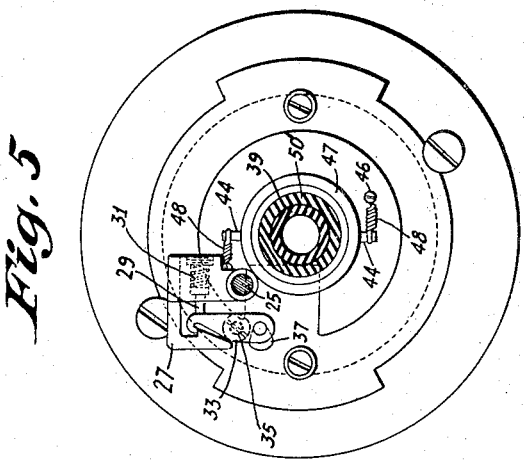

The shaft 25 extends, as shown in Fig. 2, through the frame member 11 and has attached to its inner end, the latch member 27 shaped as is shown more in detail in Fig. 5. This latch member includes a detent 29 adapted to be spring-pressed by the spring 31 to maintain the trigger member 33 in such a position as to maintain the guide members 15 and 17 in the threading position, as shown in Fig. 1.

The trigger member 33 is pivoted at 35 to a projection of the frame and is adapted to be actuated by the extension 37, as will be described hereinafter. The lower sprocket shaft 39 is journaled in the frame member 11, and has mounted on its end the sprocket 14 which is adapted to feed the film between the guide members 15 and 17 to the hub 13 of the take-up sprocket.

Figure 4:
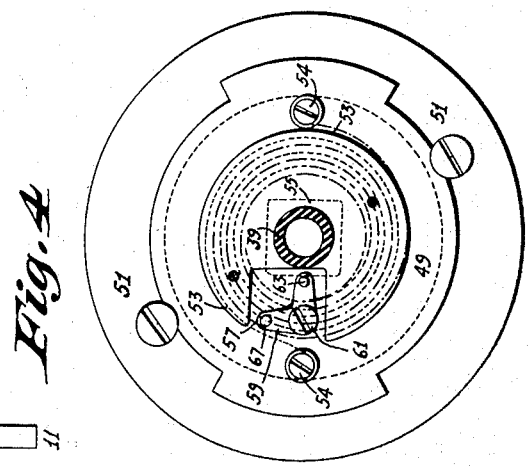
Fig. 4 is a cross-section of the film driving mechanism taken on the line 4'—4' of Fig. 3 showing some of the details of the trip mechanism; and, Fig. 5 is a similar cross-section taken on the line 5'—5' of Fig. 3 showing the details of the trigger and latch mechanisms.

The shaft 39 is indirectly actuated by the worm gear 45 as will now be described. Keyed or otherwise secured to the shaft 39 is a flywheel 43 which is adapted to give the rotating parts a uniform motion. Mounted to rotate relative to the shaft 39 and loosely secured to the face of the flywheel 43 by means of the screws 51 as shown more particularly in Figs. 3 and 4, is the plate 49. The worm gear 45, through which the mechanism being described is adapted to be driven, is also rotatably mounted on shaft 39 and is attached to the plate 49 by means of a bushing member 50'. The motion of the plate 49 relative to the flywheel 43 is limited as shown by the arrangement of the screws 51 relative to the projections of the plate 49, as shown more particularly in Fig. 5. However, the plate 49 is adapted to drive the flywheel 43 by means of a pair of springs 53 which have one end connected to screws 54 in the flywheel 43, and the other end secured to a square portion 55 of the plate.

Mounted on the bushing 50', and rotatable relative thereto, is a drive pulley 47 which is adapted to drive the pick-up reel 13 by means of a flexible spring belt 50. The pulley 47 is driven by means of springs 48 which connect pins 46 mounted in the plate 49, and pins 44 secured to the periphery of a projection 52 of the pulley.

The pulley 47, as well as the driving pulley, (not shown) of the take-up reel are so proportioned that the periphery of the hub 13 is adapted to rotate at a greater speed than the linear speed of the film as driven by the sprocket 41.

In a recess 57 of the plate 49 is disposed a bell-crank lever 59 pivoted at 61. On one arm of the bell-crank trip member 59 is provided a pin 63 which is adapted to be actuated by a slot 65 in the enlarged portion 52 of the pulley 47, as shown more clearly in Fig. 3. On the other arm of the lever 59 is the pin 67 which is adapted when in one position to co-act with the portion 37 of the trigger 33.

I will now describe the operation of my device. The film which is being fed around the sprocket 41 passes between the guides 15 and 17 to the surface of the hub 13 upon which it becomes attached, due to the fact that the hub 13 is revolving so that its periphery moves at a greater speed than the linear speed of the film. The operation of this is similar to the operation of the take-up disclosed in my co-pending application, Serial No. 392,051, filed September 21, 1929.

The take-up mechanism is being driven by means of the pulley 47. This drive, it is to be understood, is through the springs 48 which are of the proper tension to maintain the pin 67 of the trip member 59 well within the recess 57.

As the end of the film becomes attached to 18, the latter will be suddenly slowed down, which will cause the pulley 47 to be retarded relative to the plate 49 which is driving it. This causes a relative motion of the slot 65 and the plate 49 which by means of the pin 63, causes the trip member 59 to rotate about its axis 61, and causes the pin 65 to move in a path which will cause it to strike the member 37 the next time it passes it. The movement of the member 37 is transmitted to the trigger 33 and it is thereby moved against the pressure of the detent 29 to release the latch 27. This permits the upper guide 15 to move about the axis 25 under the impulse of a spring, not shown. Thus the guides clear the take-up reel, and remain in this position until they are re-set for re-threading, as described more particularly in my copending application above mentioned.

As shown in Fig. 6, at a plurality of points around the periphery of the hub of the take-up reel as is described above, are located spring-pressed plungers whose ends project about 1/8 of an inch above the surface of the hub of the drum, and as the film is fed down to the drum and partially around it by the curved portion of the lower take-up guide, one of these plungers engages in a hole in the end of the film due to the fact that the drum is driven at a slightly greater speed than the film. The cross-section of this lower take-up guide is so designed as to allow these plungers to pass freely even though the guide is in contact with the hub at its edges. After the film has become engaged with a plunger and is securely caught thereto, the film is automatically put under tension which is sufficient to depress all the succeeding pins and also to cause the second layer of film to depress the pin which caught the end of the film.

Having thus described my invention, it is to be understood that I am not to be limited by the particular form shown and described for the purpose of illustration only, but by the scope of my invention as set forth in the appended claims.

I claim:

1. In a take-up release mechanism, a take-up reel, means for driving said take-up reel including a driving member, a driven member, and a spring driving arrangement which permits relative motion between said driving and driven members, guide members adapted to be moved to operating and feeding positions, a film sprocket actuated by said driving member and adapted to move the film at a speed which is less than the speed of motion of the periphery of the hub of said take-up reel, a latch member operatively related to said guide members to retain these members in the feeding position, a trigger member for co-operation with said latch member, a trip lever having two arms pivoted on and carried with said driving member, a pin mounted on one arm of said lever adapted to be actuated by said driven member, a second pin mounted on the other arm of said lever for co-operation with said trigger member whereby relative motion of said driving and driven members, caused by the retarding of the latter member, due to the connection of the slow moving film as actuated by said sprocket to the faster moving take-up reel hub, causes said second mentioned pin to co-operate with said trigger member to release said latch member and permit the guide members to move into the operating position.

2. In a take-up release mechanism, a take-up reel, means for driving said take-up reel including a driving member, a driven member, and a spring driving arrangement permitting relative motion between said driving and driven members, guide members adapted to be moved to operating and feeding positions, a film sprocket actuated by said driving member, and adapted to move the film at a speed which is less than the speed of motion of the periphery of the hub of said take-up reel, a latch member operative to retain the guide members in the feeding positions, and means whereby relative motion of said driving and driven members due to the connection of the slow moving film as actuated by said sprocket to the faster moving take-up reel hub will release said latch member, and permit the guide members to move into the operating position.

3. In a take-up release mechanism, a take-up reel, guide members movable to feeding and operating positions for feeding the reel from a motion picture machine to said reel, means for moving the film to said reel, driving means for said reel comprising a driving and a driven member for normally driving the film so that the peripheral speed of the hub of said reel is greater than the speed of motion of said film, and means whereby a retarding of said reel due to the connection of the film thereon will cause said guide members to move to the operating position.

4. A take-up release mechanism for use in a motion picture camera in which the take-up reel is driven at such a speed that the peripheral speed of the hub is greater than the motion of the film through the machine which comprises a driving member, a driven member resiliently driven by said driving member and driving said reel, guide means for guiding the film of said reel, and means whereby when the film attaches to the hub of said reel the consequent retarding of the driven member relative to the driving member will permit said guide members to move into the operating position.

5. In a motion picture machine, a take-up release mechanism which comprises means for guiding the film toward a take-up reel and movable to feeding and operating positions, and means operated by the retardation of said reel effected upon attaching the film to said reel for permitting the guide members to be moved to the operating position.

RUSSELL P. MAY.